(12) United States Patent
Gilfix et al.

(10) Patent No.: US 8,042,118 B2
(45) Date of Patent: Oct. 18, 2011

(54) DEVELOPING DIAMETER APPLICATIONS USING DIAMETER INTERFACE SERVLETS

(75) Inventors: Michael A. Gilfix, Austin, TX (US); Rhys D. Ulerich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 11/674,976

(22) Filed: Feb. 14, 2007

(65) Prior Publication Data

US 2008/0195742 A1 Aug. 14, 2008

(51) Int. Cl.
*G06F 3/00* (2006.01)
(52) U.S. Cl. ........ 719/311; 719/313; 719/319; 719/320; 719/328
(58) Field of Classification Search .................. None
See application file for complete search history.

(56) References Cited

OTHER PUBLICATIONS

Calhoun et al. Diameter Base Protocol. [online] (Sep. 2003). Network Working Group, pp. 1-147. Retrieved From the Internet <http://www.ietf.org/rfc/rfc3588.txt>.*
Sanchez et al. An Access Control System for Multimedia Content. [online] (2006). Springer-Verlag Berlin Heidelberg, pp. 1-15. Retrieved From the Internet <http://www.springerlink.com/content/h5771j31v13h0170/>.*
Schulzrinne et al. The Session Initiation Protocol: Providing Advanced Telephony Services Across the Internet. [online] (Dec. 1998). Bell Labs Technical Journal, vol. 3 Issue 4, pp. 144-160. Retrieved From the Internet <http://onlinelibrary.wiley.com/doi/10.1002/bltj.2133/abstract>.*

* cited by examiner

*Primary Examiner* — Emerson Puente
*Assistant Examiner* — Jonathan R Labud
(74) *Attorney, Agent, or Firm* — Stephen J. Walder, Jr.; David A. Mims, Jr.

(57) ABSTRACT

Mechanisms for developing Diameter applications are provided. The mechanisms extend the application server servlet model to support Diameter applications. A "base protocol" servlet is provided that handles the basic Diameter protocol functionality. Base application servlets are provided for each Diameter interface (for example, an "Sh" base servlet for the IMS "Sh" interface). These servlets are base classes for application code. The base application servlets implement additional semantics on top of the base protocol servlet to support additional attribute-value pair semantics. With the system and method, Diameter servlets share the same ServletContext as HTTP and SIP servlets. This mechanism facilitates communication between the various application entities and facilitates generation of converged applications.

20 Claims, 6 Drawing Sheets

```
public abstract class DiameterBaseProtocolServlet{ public void doRequest(DiameterRequest request){
        //Routes based on a command code to the appropriate request method
    } public void doResponse(DiameterResponse response){
        //Routes based on command code and response code to appropriate response
    method
    } public abstract void doAbortSessionRequest(DiameterRequest request);

public abstract void doAbortSessionResponse(DiameterResponse response);

//..etc.
    // The list of base Diameter commands is listed in section 3.1 of RFC 3588.
    // In an alternative implementation, a method for each response does not have to be
    provided
    // Rather, a doSuccessResponse() and doErrorResponse() method may be provided
    which
    // receives general responses or requests.
}
```

*FIG. 7A*

```
public abstract class  DiameterShApplicationServlet extends DiameterBaseProtocolServlet{ public abstract void doUserDataRequest(DiameterRequest request);

public abstract void doUserDataResponse(DiameterResponse response);

//..etc.
}
```

*FIG. 7B*

DEVELOPING DIAMETER APPLICATIONS USING DIAMETER INTERFACE SERVLETS

BACKGROUND

1. Technical Field

The present application relates generally to an improved data processing system and method. More specifically, the present application is directed to a system and method for developing Diameter applications.

2. Description of Related Art

The Diameter protocol is a relatively new protocol proposed by the Internet Engineering Task Force (IETF) for Authentication, Authorization, and Accounting (AAA) purposes. The Diameter protocol is a binary protocol that consists of a message header followed by attribute-value pairs. The header contains a field indicating the command code for the message and whether the message is a request or a response. The command code provides the context necessary to interpret the semantics of the attribute-value pairs within the message body. The Diameter protocol specification consists of a base protocol specification (RFC 3588 available at www.ietf.org/rfc/rfc3588.txt) and Diameter applications. The base protocol specifies a number of attribute-value pairs that are common to all Diameter applications. A Diameter application extends the base protocol by defining new commands and attribute-value pairs. These must be interpreted by the Diameter element logic accordingly.

The Diameter protocol is one of the fundamental protocols proposed for the IP-Multimedia Sub-system (IMS) architecture. The IMS architecture is a Third Generation Partnership Project (3GPP) standard architecture describing components that sit at the core infrastructure of a voice over internet protocol (VoIP) service provider (see www.3gpp.org for more information). The IMS architecture offers significant value to service providers since it allows them to introduce new real-time multimedia services and provide end users with a seamless experience across multiple access networks. Within IMS, Diameter operates on top of reliable transport protocols, such as the Transport Control Protocol (TCP).

FIG. 1 is an exemplary diagram of the architecture of the Diameter protocol stack. As shown in FIG. 1, the Diameter base protocol 130 lies on top of the TCP layer 120, which is above the IP layer 110. On top of the Diameter base protocol 130 are predefined interfaces 140 for IMS functionality. These interfaces 140 are common to all Diameter applications, which provide the Diameter extensions 150.

The Diameter base protocol 130 provides basic services including delivery of attribute-value pairs (AVPs), capability negotiation, error notification, accounting services, and extensibility via new command codes and AVPs. The IMS architecture defines several Diameter interfaces 140, between various IMS components. These interfaces extend the basic services of the Diameter base protocol 130 and provide support for authentication and authorization functions. Examples of such interfaces are the IMS Sh, Dh, Cx, Ro, Rf, and Dx interfaces, which are illustrated in FIG. 2 for an IMS architecture.

As shown in FIG. 2, the IMS architecture includes an Application Server (AS) 210, Call Session Control Functions (CSCF) which may be either an Interrogating CSCF (I-CSCF) 220 or a Service CSCF (S-CSCF) 230, a Home Subscriber Server (HSS) 240, and a Subscription Locator Function (SLF) 250. With reference to FIG. 2, the IMS "Sh" interface is an interface that provides a method of communication between a Session Initiation Protocol (SIP) Application Server (AS) 210 function and Home Subscriber Server (HSS) network elements 240, or between multiple IMS Application Servers 210. The "Sh" interface allows for download and update of transparent and non-transparent user data and request and send notifications on changes in the user data.

The IMS "Dh" interface is used between the AS 210 and the SLF 250. The "Dh" interface is used to get the address of the HSS 240 serving an IMS public user identity or public service identity. The "Dh" interface uses the same message set as the "Sh" interface.

The "Cx" interface operates between an I-CSCF 220 and the HSS 240 and between the S-CSCF 230 and the HSS 240. The "Cx" interface allows for location management procedures (exchange of location information), user data handling procedures (download user data stored in the server), and user authentication procedures. The HSS 240 implements the Diameter multimedia server side of the "Cx" interface while the I-CSCF 220 and the S-CSCF 230 implement the Diameter Multimedia client side of the "Cx" interface.

The "Dx" interface is used between the I-CSCF 220 and the S-CSCF 230, and the SLF 250. The "Dx" interface is used to get the address of the HSS 240 serving an IMS Public User Identity or Public Service Identity. The "Dx" interface uses the same message set as the "Cx" interface.

For charging, the 3GPP defines two types of interfaces. The online charging interface "Ro" is used for real-time billing while a service is occurring. Charging information can affect the service being rendered. The offline charging interface "Rf" is used to transfer charging information that will not affect, in real-time, the service being rendered. The "Ro" interface is based on the IETF defined Credit Control Application (RFC 4006). The "Ro" interface uses the Credit-Control command (CCR/CCA). The "Rf" interface is based on the accounting functionality of IETF-Diameter base (RFC 3588) and uses the accounting command (ACR/ACA). Other interfaces may also be provided as common interfaces that extend the Diameter base protocol but which are common to all Diameter applications.

Another core protocol of the IMS architecture is the Session Initiation Protocol (SIP) which is a signaling protocol used to setup multimedia sessions. The SIP programming model for the J2EE application server environment consists of a SIP servlet container. Applications are structured as servlet logic with lower-level communication being handled by the SIP container. Various RFCs and specifications cover SIP, RFC 3261 covers the SIP base protocol, RFC 3262 covers the SIP PRACK extension, FRC 3265 covers SIP event notification, and JSR 116 is the SIP servlet specification.

As mentioned above, the Diameter protocol stack is built upon IP and TCP layers of communication. The HyperText Transfer Protocol (HTTP) is one of the base transport protocols for the Internet. A typical programming model for handling Internet requests is via the HTTP servlet programming model. RFC 2616 covers the HTTP v1.1 protocol.

Many IMS-based applications require HTTP, SIP, and Diameter capabilities for completeness. For example, a conferencing application may provide an HTTP-based "view" of conference participants, SIP may provide the voice signaling required, and Diameter may be used to record chargeable events using the Ro interface. Currently, HTTP and SIP logic can be written using Java Servlet technologies within a converged HTTP/SIP servlet container, e.g., see WebSphere Application Server 6.1. Diameter application logic, however, currently cannot be written using Java Servlet techniques. Thus, Diameter application logic cannot leverage traditional Java Servlet strengths such as high availability, flexible request dispatching, application packaging, application tooling, application deployment, load balancing, and converged session affinity in a clustered environment.

SUMMARY

The illustrative embodiments provide a system and method for developing Diameter applications. The system and method of the illustrative embodiments extend the application server servlet model to support Diameter applications. By defining a servlet based programming model for Diameter application logic, the illustrative embodiments allow Diameter applications to take advantage of traditional Java Servlet strengths such as high availability, flexible request dispatching, application packaging, application tooling, application deployment, load balancing, and converged session affinity in a clustered environment.

With the illustrative embodiments, a "base protocol" servlet is provided for Diameter application developers that wish to create their own custom Diameter applications. The "base protocol" servlet provides the basic Diameter protocol functionality. Base application servlets are provided for each Diameter interface (for example, an "Sh" base servlet for the IMS "Sh" interface). These servlets are base classes for application code that is to implement a particular application.

These base application servlets implement additional semantics on top of the base protocol servlet to support additional attribute-value pair semantics. The servlet container implementation may optionally provide special services, i.e. special handling logic, to applications that it recognizes to be part of a specific Diameter application. This can be achieved by checking the base class of the application and, if the base class matches a particular Diameter application name, the Diameter servlet container may enable that specific application logic for that application.

The Diameter servlet programming model of the illustrative embodiment integrates directly within the extended J2EE application model defined within the SIP JSR 116 specification and the upcoming JSR 289 SIP Servlet revision. Diameter servlets are an additional servlet component with the SAR format. This implies additional integration between the various servlet containers. Diameter servlets share the same ServletContext as HTTP and SIP servlets. This mechanism helps to facilitate communication between the various application entities.

In addition, shared servlet context and shared bundling eases creation of converged applications across protocols. An example of a converged SIP/Diameter application is the call setup found in IMS, where during call setup, the SIP entity consults a database using Diameter to fetch user profile information. This model also allows the definition of converged HTTP/Diameter applications where to query user profile information in an IMS architecture, an HTTP servlet interacts with a Diameter servlet to fetch information from a back-end database (such as an HSS) and render that information to the user. Converged HTTP/SIP/Diameter applications are then a logical extension of this.

As part of the Servlet component model, Diameter Servlet applications have a deployment descriptor. This descriptor can contain application specific parameters used for container configuration or for inclusion of filter criteria that determine when that piece of application logic should be invoked.

The use of the servlet model provides a platform flexible enough to accommodate both client and server interactions within a single application. This model provides maximum flexibility to structure the application either as a Diameter client or as a Diameter server, relay or proxy element. In addition, this model also supports the enabling of SIP application composition where only a subset of units within the application composition structure perform Diameter interactions.

In one illustrative embodiment, a method for generating a Diameter protocol application is provided. The method may comprise providing a Diameter protocol servlet container having one or more Diameter protocol servlets for processing Diameter protocol messages and providing a Diameter protocol application that invokes at least one Diameter protocol servlet of the one or more Diameter protocol servlets of the Diameter protocol servlet container. The method may further comprise providing a Diameter protocol application deployment descriptor for the Diameter protocol application and deploying the Diameter protocol application in the data processing system using the Diameter protocol servlet container and the deployment descriptor to generate the Diameter protocol application.

Providing the Diameter protocol servlet container may comprise providing a base Diameter protocol servlet, wherein the base Diameter protocol servlet handles basic Diameter message processing and provides support for a basic set of attribute-value pairs. Providing the Diameter protocol servlet container may further comprise providing one or more base application servlets for one or more Diameter inteprotocol interfaces. The one or more base application servlets may extend a functionality of the base Diameter protocol servlet to handle additional attribute-value pairs.

The method may further comprise providing at least one other protocol container for processing messages in another protocol different from the Diameter protocol. The Diameter protocol container and the at least one other protocol container may be integrated with one another. The Diameter protocol container and the at least one other protocol container may be integrated with one another by sharing a same servlet context object between the Diameter protocol container and the at least one other protocol container. The servlet context object may provide a Diameter protocol factory application program interface (API) through which the Diameter protocol servlet container creates new sessions and requests from within a Diameter protocol servlet. The at least one other protocol container may be one of a HyperText Transfer Protocol (HTTP) container or a Session Initiation Protocol (SIP) container.

The Diameter protocol application may be a converged application that utilizes the Diameter protocol and one or more other protocols to perform one or more operations. The converged application may be one of a HypterText Transfer Protocol (HTTP) and Diameter protocol application, a Session Initiation Protocol (SIP) and Diameter protocol application, or an HTTP and SIP and Diameter protocol application.

Deploying the Diameter protocol application in the data processing system may comprise processing the Diameter protocol application deployment descriptor by the Diameter protocol servlet container to identify one or more classes to load as Diameter protocol servlets. Deploying the Diameter protocol application may further comprise mapping incoming Diameter protocol messages to a Diameter protocol servlet as defined by the Diameter protocol application and invoking a Diameter protocol servlet based on the mapping.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 7A and 7B provide exemplary code for defining a Diameter base protocol servlet and a base application servlet for a Diameter interface in accordance with one illustrative embodiment.

DETAILED DESCRIPTION OF THE ILLUSTRATIVE EMBODIMENTS

Figure 1:
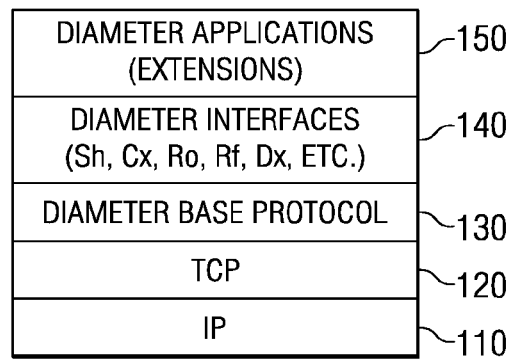
FIG. 1 is an exemplary diagram of the architecture of the Diameter protocol stack.
Figure 2:
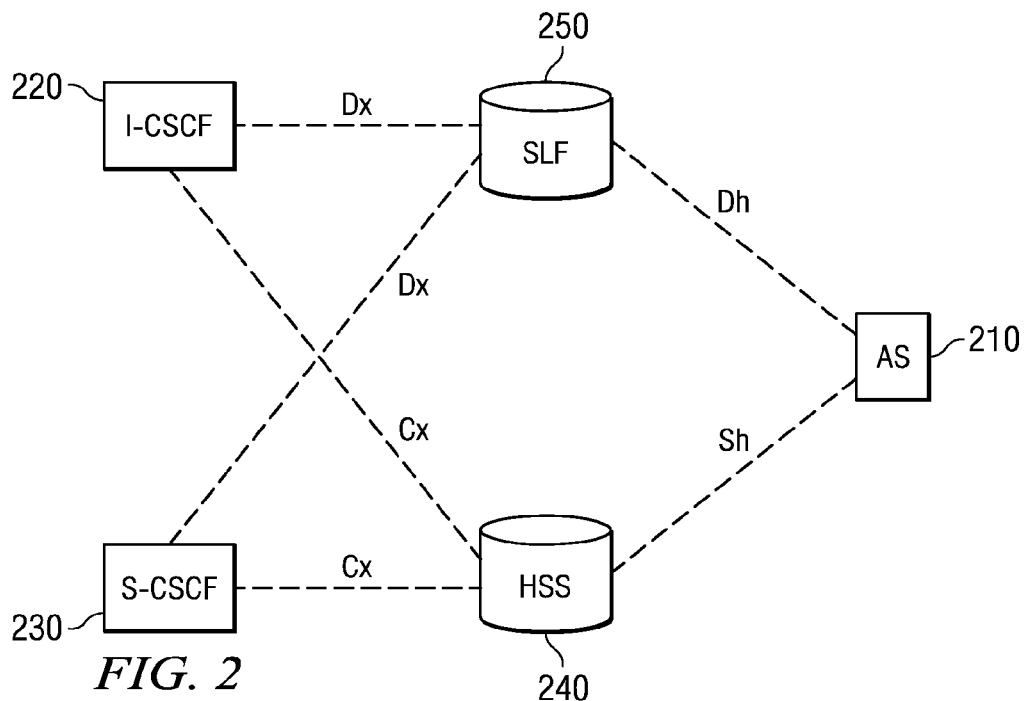
FIG. 2 is an exemplary diagram illustrating the use of Diameter interfaces with regard to a IMS architecture.
Figure 3:
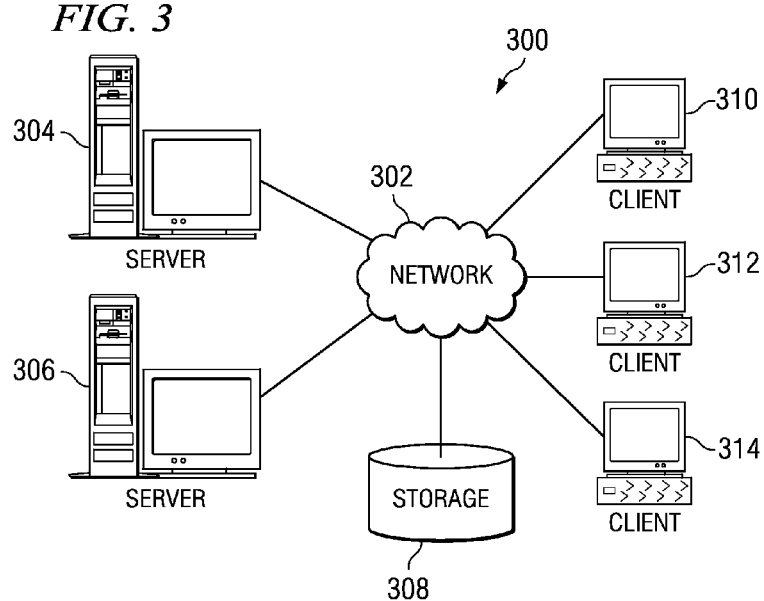
FIG. 3 is an exemplary diagram depicting a pictorial representation of an exemplary distributed data processing system in which aspects of the illustrative embodiments may be implemented.
Figure 4:
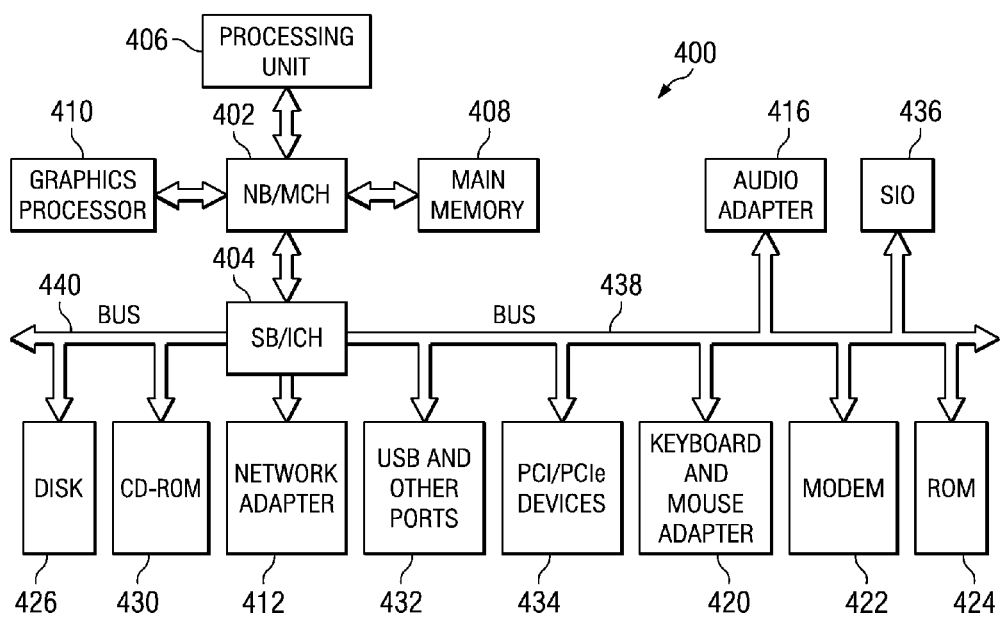
FIG. 4 is a block diagram of an exemplary data processing system in which aspects of the illustrative embodiments may be implemented.

The illustrative embodiments provide a system and method for programming Diameter applications using a servlet model. As such, the illustrative embodiments are especially well suited for use in generating Diameter applications for use in distributed data processing environments. Thus, FIGS. 3-4 are provided hereafter as an example of a distributed data processing environment and data processing device in which the exemplary aspects of the illustrative embodiments may be implemented. It should be appreciated that FIGS. 3-4 are only exemplary and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an exemplary distributed data processing system in which aspects of the illustrative embodiments may be implemented. Distributed data processing system 300 may include a network of computers in which embodiments of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 are connected to network 302 along with storage unit 308. In addition, clients 310, 312, and 314 are also connected to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

With reference now to FIG. 4, a block diagram of an exemplary data processing system is shown in which aspects of the illustrative embodiments may be implemented. Data processing system 400 is an example of a computer, such as clients 310 in FIG. 3, in which computer usable code or instructions implementing the processes for illustrative embodiments of the present invention may be located.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash binary input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 400 (Java is a trademark of Sun Microsystems, Inc. in the United States, other countries, or both).

As a server, data processing system 400 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

Those of ordinary skill in the art will appreciate that the hardware in FIGS. 3-4 may vary depending on the implementation. Other internal hardware or peripheral devices, such as flash memory, equivalent non-volatile memory, or optical disk drives and the like, may be used in addition to or in place of the hardware depicted in FIGS. 3-4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device which is configured with flash memory to provide non-volatile memory for storing operating system files and/or user-generated data, for example. Essentially, data processing system 400 may be any known or later developed data processing system without architectural limitation.

The illustrative embodiments provide a programmatic model which may be implemented in a distributed data processing system, such as shown in FIG. 3, and in one or more data processing devices of a distributed data processing system, such as the data processing device shown in FIG. 4. The programmatic model uses servlets to provide basic Diameter functionality upon which Diameter applications may be developed as additional servlets via one or more programming model containers. Such Diameter applications may be used to provide functionality in an IP-Multimedia Sub-system (IMS) architecture, for example.

Figure 5:
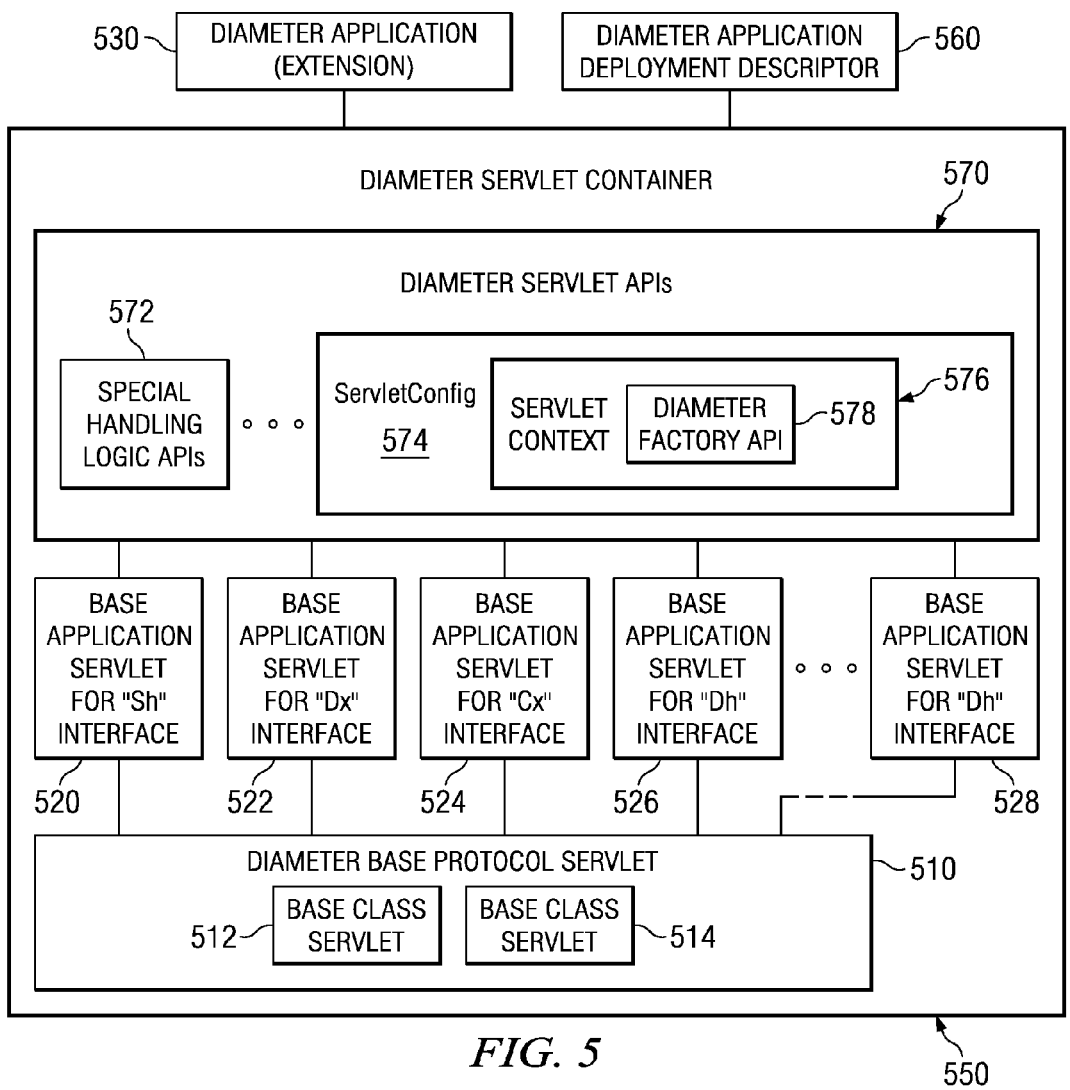
FIG. 5 is an exemplary block diagram illustrating the programmatic model according to one illustrative embodiment.

FIG. 5 is an exemplary block diagram illustrating the programmatic model according to one illustrative embodiment. As shown in FIG. 5, the programmatic model, in accordance with the illustrative embodiments, includes a "base protocol" servlet 510 which handles basic Diameter message processing using one or more base class servlets 512-514. Diameter application developers that wish to create their own custom Diameter applications may build upon this Diameter base protocol servlet 510 by providing additional Diameter application servlets 530 that extend the functionality of the Diameter base protocol servlet 510 through invoking the Diameter base protocol servlet 510.

The "base protocol" servlet provides the basic Diameter protocol functionality. Base application servlets 520-528 are provided for each Diameter interface (for example, an "Sh" base servlet for the IMS "Sh" interface). These base application servlets 520-528 are base classes for Diameter application code that is to implement a particular application.

These base application servlets 520-528 implement additional semantics on top of the Diameter base protocol servlet 510 to support additional attribute-value pair (AVP) semantics. The Diameter servlet container 550 implementation may optionally provide special services, i.e. special handling logic 572, to Diameter applications 530 that it recognizes to be part of a specific Diameter application. This can be achieved by checking the Diameter base class servlets 520-528 invoked by the Diameter application 530 and, if the base class matches a particular Diameter base application servlet 520-528 name, the Diameter servlet container 550 may enable the specific specialized handling logic 572 for that Diameter base application servlet 520-528 for that Diameter application 530.

The Diameter servlet programming model of the illustrative embodiment integrates directly within the extended J2EE application model defined within the SIP JSR 116 specification. Diameter servlets are an additional servlet component with the Servlet Archive (SAR) format. As a result, additional integration between the various servlet containers, i.e. the Diameter servlet container 550 and HTTP and SIP containers, is made possible. That is, Diameter servlets share the same ServletContext object 576, provided via the Diameter servlet APIs 570 of the Diameter servlet container 550, with the HTTP and SIP servlets, which is provided to the servlets as part of the Servlet Configuration object 574.

The ServletContext object 576 provides a Diameter Factory API 578 through which the Diameter servlet container 550 may create new sessions and requests from within a Diameter servlet. The ServletContext object 576 further defines the methods that are used by the various servlets, e.g., servlets 510 and 520-528, to communicate with their servlet containers, e.g., Diameter servlet container 550. The servlet containers themselves handle the processing of requests and responses to/from the servlets, decide which applications to invoke and in what order to invoke them, and contain and manage the servlets through their lifecycle.

Since all of the servlets utilize the same methods to communicate with their respective containers by virtue of the common ServletContext object 576, communication between the various Diameter, HTTP, and SIP application entities is made possible via the ServletContext object 576 methods and their respective servlet containers.

In addition, the shared servlet context 576, e.g. via ServletContext object, eases creation of converged applications across protocols. A converged application is an application that uses more than one protocol to achieve a desired functionality or result. An example of a converged SIP/Diameter application is the call setup found in IMS architectures where, during call setup, a SIP entity consults a database using Diameter to fetch user profile information. The programmatic model of the illustrative embodiments allows the definition of converged HTTP/Diameter applications as well, where to query user profile information in an IMS architecture, an HTTP servlet interacts with a Diameter servlet to fetch information from a back-end database (such as an HSS) and renders that information to the user. Converged HTTP/SIP/Diameter applications are then a logical extension of this.

For example, the SIP Servlet specification defines a SipApplicationSession object which contains one or more SIP and HTTP protocol sessions. When the SIP container dispatches a SIP message to a SIP Servlet, the servlet can retrieve a SIP protocol-specific session object. From the protocol-specific session object, the SIP container can obtain the converged SipApplicationSession object. From that converged session, the servlet can access both SIP and HTTP protocol sessions directly. It is this access that allows HTTP Servlets and SIP Servlets to communicate within one converged session.

With the illustrative embodiments, the Diameter servlet container may provide a Diameter protocol-specific session object when it dispatches a Diameter message to a Diameter servlet. Similarly, the servlet can obtain a converged session object giving Diameter servlets access to other SIP and HTTP protocol sessions. Similarly, SIP and HTTP Servlets can use the same converged session to access Diameter protocol-specific sessions. This mechanism allows incoming messages in any of the three protocols access to any other protocol-specifics. When a SIP, HTTP, or Diameter servlet wishes to create a new Diameter protocol-session, it may do so through the Diameter Factory API 578. The SIP Servlet Factory APIs require that the requesting servlet provide an existing converged session to house any new Diameter-specific sessions.

As part of the servlet component model, Diameter applications 530 have a Diameter application deployment descriptor 560, which is a configuration file that directs a deployment tool to deploy the Diameter application 530 with specific container options and describes specific configuration requirements that a deployer must resolve. For example, this Diameter application deployment descriptor 560 may contain application specific parameters used for Diameter servlet container 550 configuration, for inclusion of filter criteria that determines when the application logic of the Diameter application 530 should be invoked, or the like.

At application startup time, the Diameter servlet container 550 investigates the Diameter application deployment descriptor 560 to determine which Java classes should be loaded as Diameter servlets. Each one of these servlets will extend the Diameter base protocol servlet 510 and potentially one of the Diameter interface-specific servlets 520, 522, 524, 526, and 528 using traditional Java class inheritance. The Diameter servlet container 550 uses the Diameter application deployment descriptor 560 to map incoming Diameter protocol messages to a particular application-defined servlet. When an incoming Diameter message arrives via the network, the Diameter servlet container 550 consults these mappings to choose a Diameter servlet to invoke to handle the message.

The invocation uses one of the methods defined in the Diameter interface-specific servlet 520, 522, 524, 526, and/or 528. During the invocation, the servlet may choose to access its deployment configuration through the ServletConfig 574, it may choose to access information shared with other servlets in the same application archive through the ServletContext 576, or it may utilize a Diameter Factory API 578 to create new Diameter messages. The servlet may generate responses to an incoming message or modify Diameter-protocol artifacts (e.g., particular attribute-value pairs) using special handling logic APIs 572. These mechanisms are patterned on the HTTP Servlet and SIP Servlet specifications, ensuring the familiarity of the programming API to existing Java Servlet developers.

Thus, with the programmatic model of the illustrative embodiments, in order for one to deploy a Diameter application 530, one need only provide the Diameter application logic 530 and a Diameter application deployment descriptor 560 which is used to configure the Diameter servlet container 550 provided by the mechanisms of the illustrative embodiments. A deployment tool deploys the Diameter application 530 with a specific configuration of the Diameter servlet container 550. The Diameter servlet container 550, based on the configuration specified in the Diameter application deployment descriptor 560, invokes the Diameter application logic 530, handles the processing of requests and responses to/from the Diameter servlets, and manages the Diameter servlets 510 and 520-528.

The use of the servlet model in the Diameter programmatic model of the illustrative embodiments provides a platform flexible enough to accommodate both client and server interactions within a single Diameter application 530. The servlet model provides maximum flexibility to structure the Diameter application 530 either as a Diameter client or as a Diameter server, relay or proxy element. In addition, this servlet model also supports the enabling of SIP application composition where only a subset of units within the application composition structure perform Diameter interactions.

Figure 6:
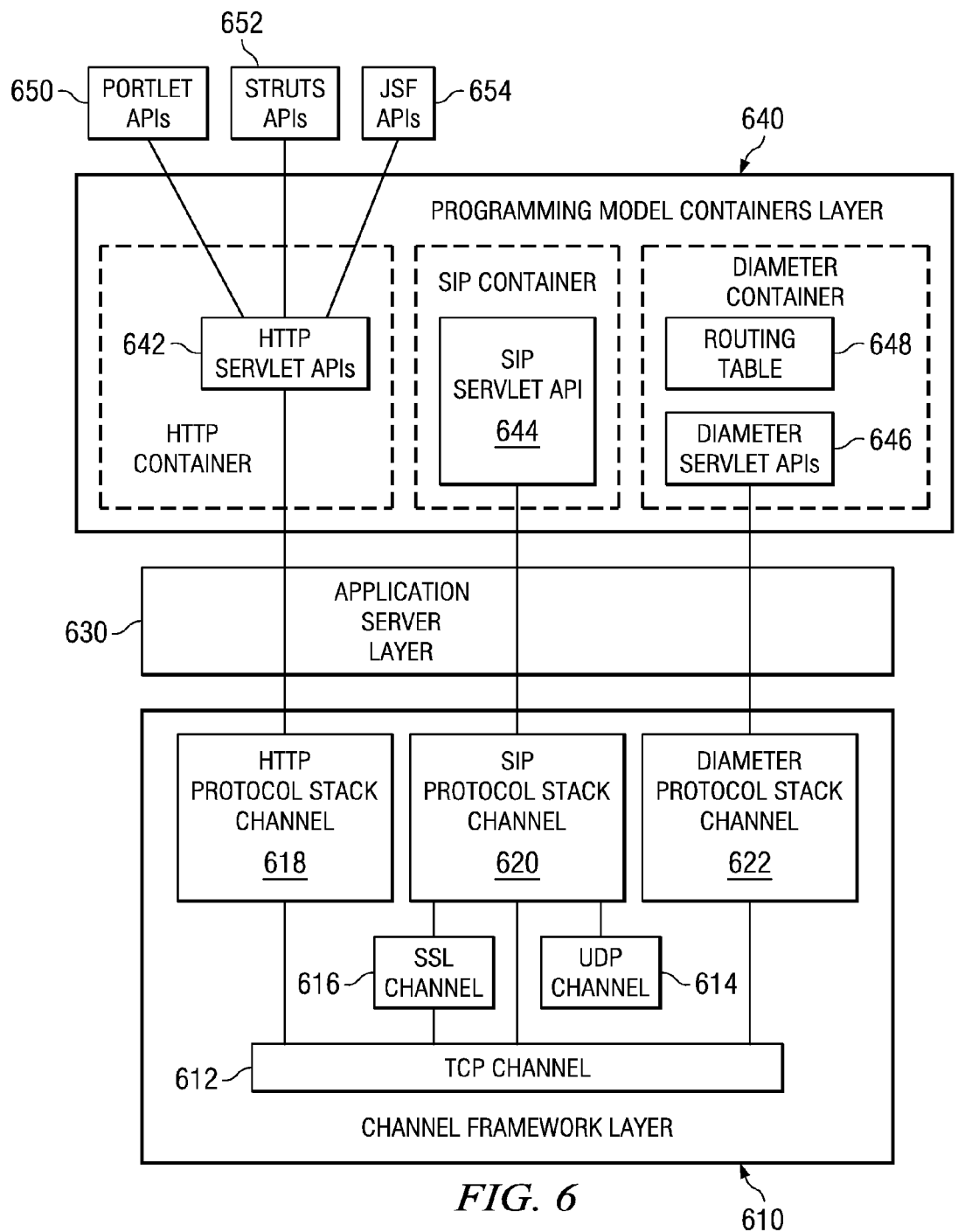
FIG. 6 is an exemplary block diagram of a data processing environment in which the mechanisms of FIG. 5 may be implemented.

FIG. 6 is an exemplary block diagram of a data processing environment in which the mechanisms of FIG. 5 may be implemented. As shown in FIG. 6, the data processing environment includes a channel framework layer 610, an application server layer 630, and a programming model containers layer 640. The channel framework layer 610 includes a Transmission Control Protocol (TCP) channel 612, a User Datagram Protocol (UDP) channel 614, a Secure Socket Layer (SSL) channel 616, a HyperText Transfer Protocol (HTTP) protocol stack channel 618, a Session Initiation Protocol (SIP) protocol stack channel 620, and a Diameter protocol stack channel 622.

The application server layer 630 provides the applications with which communication is performed via the channel framework layer 610. In the depicted example, the application server layer 630 may include Web applications, SIP applications, and Diameter applications. Moreover, the application server layer 630 may include converged applications that utilize two or more of HTTP, SIP and Diameter, as mentioned above.

In addition to the above, the application server layer 630 manages application state on behalf of the servlet logic in the various containers of the programming model containers layer 640. By bundling together converged state via the shared ServletContext object 576 in FIG. 5, and allowing the application server layer 630 to manage application state on behalf of the servlet logic, during a failure, the entire state of the converged application across all protocols can be transported to a separate container in the programming model containers layer 640. Error handling as a result of the failure may then be performed in a manner specific to the Diameter protocol and Diameter application.

The programming model containers layer 640 provides the protocol servlet application program interfaces (APIs) and base servlets upon which the applications in the application server layer 630 are built. As shown in FIG. 6, in the depicted example, the programming model containers layer 640 includes HTTP servlet APIs 642, SIP servlet API 644, and Diameter servlet APIs 646. With regard to the Diameter containers in the programming model containers level 640, such Diameter containers may be configured in the manner outlined in FIG. 5 above.

The HTTP servlet API may further be associated with portlet APIs 650, Struts APIs 652, and JavaServer Faces (JSF) APIs 654. Portlets are special reusable Java servlets that appear as defined regions on portal pages. Struts are an extension the Java servlets API that focuses on using a model-view-controller architecture. JavaServer Faces is a Java-based Web application framework that simplifies the development of user interfaces for Java applications.

The TCP channel 612, UDP channel 614, SSL channel 616, HTTP protocol stack channel 618, and SIP protocol stack channel 620 of the channel framework layer 610 operate in much the same manner as is generally known in the art. However, with regard to the illustrative embodiments, it should be noted that Diameter requests and response may be wrapped in HTTP requests/responses for transmission via the TCP channel 612, as shown. The Diameter protocol stack channel 622 handles communication channel setup, binary message parsing and marshalling, and transport of Diameter messages to/from the TCP channel 612 and the Diameter applications via Diameter servlet containers. For example, the Diameter protocol stack channel 622 may operate in concert with the Diameter base protocol servlet 510 of a Diameter servlet container 550 in FIG. 5, provided in the programming model containers layer 640, to handle communications with a Diameter application 530 that may be provided in the application server layer 630. The Diameter servlet APIs 646, which may include the Diameter servlet APIs 570 in FIG. 5, for example, may be used by the Diameter servlet container 550 to communicate with and control the invoking of servlets in the Diameter servlet container and control the invoking of Diameter application logic in the application server layer 630.

It should be appreciated that multiple Diameter applications within the same Diameter servlet container may make use of peering connections for various transactions and thus, being able to discern between these various Diameter applications during routing of communications between the Diameter protocol stack channel 622 and the Diameter application is important in proper operation of the programming model. In order to provide such discernment, various identifiers may be utilized to aid in routing requests/response to/from servlets and application logic.

First, an end-to-end identifier may be used for the purpose of maintaining a routing table 648 within the Diameter servlet container and directing requests and responses to/from the appropriate application logic. Moreover, a hop-by-hop identifier may be used by the Diameter protocol stack channel 622 for determining which connection to route requests to. The hop-by-hop identifier is a Diameter protocol detail discussed in RFC 3588 section 3, 5.5.4. The hop-by-hop identifier is used to match Diameter requests with responses. With regard to the illustrative embodiments, the hop-by-hop identifier may be used in accordance with the intended use specified in RFC 3588.

Control may be passed to the servlet, in a manner generally known in the art, so that the servlet may handle a request. The Diameter servlet container would use the end-to-end identifier to fetch the servlet context and state information and provide this context and state information to the servlet logic before passing off execution. Servlet logic is written in a re-entrant fashion and thus, can handle state information passed by the Diameter servlet container appropriately.

Thus, when a connection is established between a Diameter application and another endpoint via the Diameter servlet container and the channel framework layer 610, a unique end-to-end identifier may be assigned to the connection and stored in the routing table 648 of the Diameter servlet container. For example, the Diameter Factory API 578 in FIG. 5 may be used for creating requests from within a servlet and, as a result, may provide the Diameter servlet container 550 with the ability to make appropriate entries into its routing table 648 for the application logic, as well as structure the request. As part of this generation of entries in the routing table 648 and the generation of the request, the unique end-to-end identifier may be generated and included in the routing table entry and as an attribute-value pair in the Diameter request. This end-to-end identifier may then be returned in any subsequent responses from the other endpoint so as to facilitate routing of the response to the appropriate Diameter application logic.

FIGS. 7A and 7B provide exemplary code for defining a Diameter base protocol servlet, such as the Diameter base protocol servlet 510 in FIG. 5, and a base application servlet for a Diameter interface, such as base application servlet 520 in FIG. 5. It should be appreciated that the names provided for each method and exact arguments are meant only to be illustrative and are not intended to state or imply any limitation with regard to the mechanisms of the illustrative embodiments.

In the depicted examples of FIGS. 7A and 7B, "doService( )" methods of the base servlet classes contain logic that determines whether a request or response is being processed and passes off execution to an appropriate doRequest( ) or doResponse( ) method of the DiameterBaseProtocolServlet. This provides a tie between the Java servlet model and the Diameter servlet programming model of the illustrative embodiments.

The Diameter base protocol servlet, shown in FIG. 7A, contains methods of reach of the base protocol command and response interactions. Applications, such as the base application servlet shown in FIG. 7B, may then extend the base protocol to support additional commands with base semantics. It should be noted that the "command code" and "response code" mentioned in the depicted example are Diameter-protocol artifacts introduced in RFC 3588 Section 3. These codes are used to communicate the command associated with a message. The command code or response code is a numeric value whose interpretation depends on the command R(equest) flag. Each Diameter interface, e.g., Sh, Ro, etc., defines standardized command or response codes for use.

Figure 8:
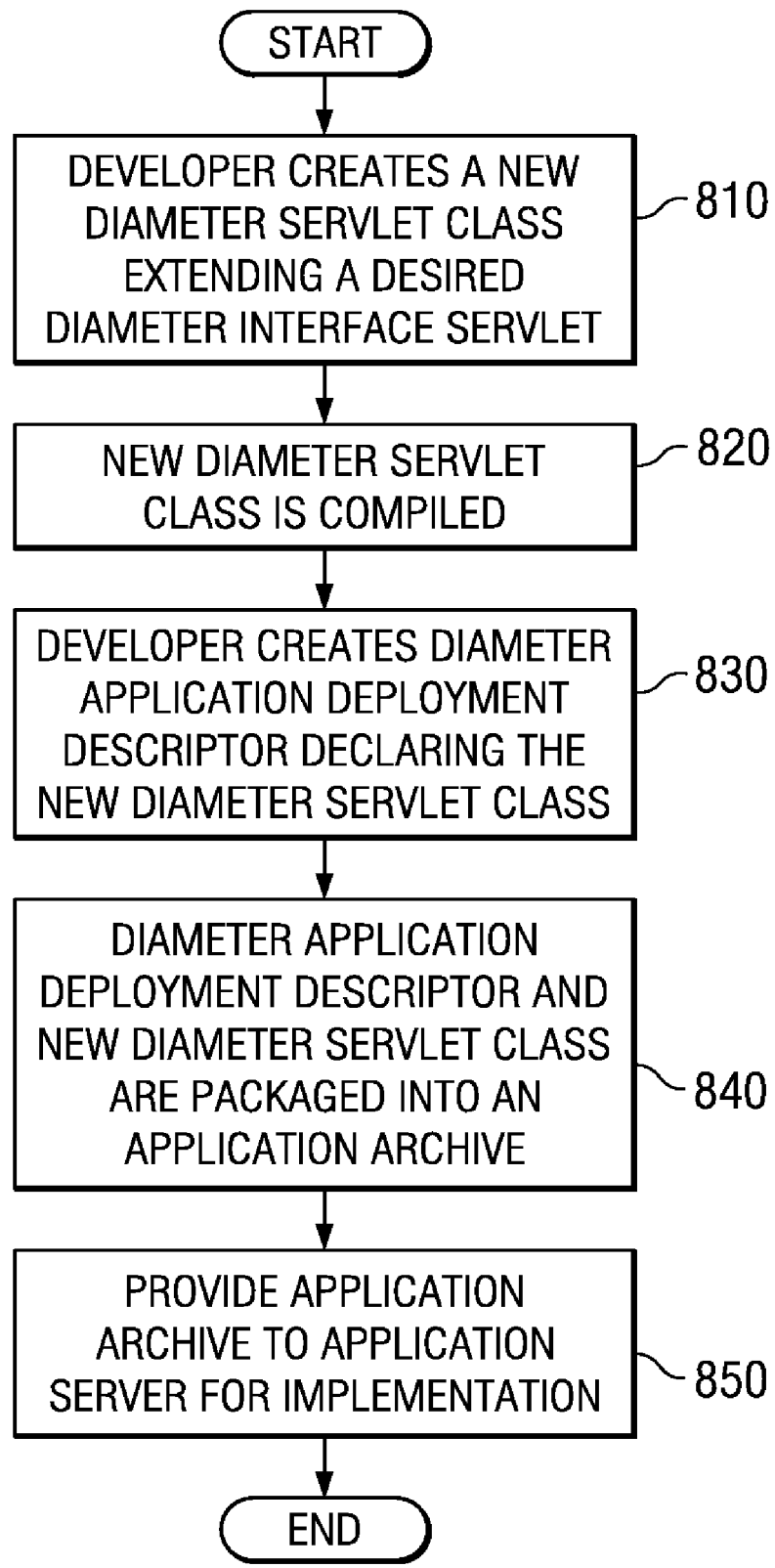
FIG. 8 is a flowchart outlining an exemplary operation for generating a Diameter application in accordance with the programmatic model of one illustrative embodiment.

FIG. 8 is a flowchart outlining an exemplary operation for generating a Diameter application in accordance with the programmatic model of one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 8, the operation starts with a developer creating a new Diameter servlet class extending a desired Diameter interface servlet, via a development tool implementing the Diameter servlet model described above (step 810). This new Diameter servlet class may override methods found in the superclass to perform application logic on receipt of particular Diameter messages. The developer may then compile the new Diameter servlet class (step 820) and create a Diameter application deployment descriptor declaring the new Diameter servlet class (step 830). The developer may then package both the Diameter application deployment descriptor and the new Diameter servlet class into an application archive (step 840). The application archive may then be provided to and utilized with an application server or other computing device for providing the Diameter servlet defined in the Diameter servlet class and deployment descriptor (step 850). The operation then terminates.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating a Diameter protocol application, comprising:
   providing a Diameter protocol servlet container having one or more Diameter protocol servlets for processing Diameter protocol messages;
   providing a Diameter protocol application that invokes at least one Diameter protocol servlet of the one or more Diameter protocol servlets of the Diameter protocol servlet container;
   providing a Diameter protocol application deployment descriptor for the Diameter protocol application; and
   deploying the Diameter protocol application in the data processing system using the Diameter protocol servlet container and the deployment descriptor to generate the Diameter protocol application.

2. The method of claim 1, wherein providing the Diameter protocol servlet container comprises:
   providing a base Diameter protocol servlet, wherein the base Diameter protocol servlet handles basic Diameter message processing and provides support for a basic set of attribute-value pairs.

3. The method of claim 2, wherein providing the Diameter protocol servlet container further comprises:
   providing one or more base application servlets for one or more Diameter inteprotocol interfaces, wherein the one or more base application servlets extend a functionality of the base Diameter protocol servlet to handle additional attribute-value pairs.

4. The method of claim 1, further comprising:
   providing at least one other protocol container for processing messages in another protocol different from the Diameter protocol, wherein the Diameter protocol container and the at least one other protocol container are integrated with one another.

5. The method of claim 4, wherein the Diameter protocol container and the at least one other protocol container are integrated with one another by sharing a same servlet context object between the Diameter protocol container and the at least one other protocol container.

6. The method of claim 5, wherein the servlet context object provides a Diameter protocol factory application program interface (API) through which the Diameter protocol servlet container creates new sessions and requests from within a Diameter protocol servlet.

7. The method of claim 4, wherein the at least one other protocol container is one of a HyperText Transfer Protocol (HTTP) container or a Session Initiation Protocol (SIP) container.

8. The method of claim 1, wherein the Diameter protocol application is a converged application that utilizes the Diameter protocol and one or more other protocols to perform one or more operations.

9. The method of claim 8, wherein the converged application is one of a HyperText Transfer Protocol (HTTP) and Diameter protocol application, a Session Initiation Protocol (SIP) and Diameter protocol application, or an HTTP and SIP and Diameter protocol application.

10. The method of claim 1, wherein deploying the Diameter protocol application in the data processing system comprises:
processing the Diameter protocol application deployment descriptor by the Diameter protocol servlet container to identify one or more classes to load as Diameter protocol servlets;
mapping incoming Diameter protocol messages to a Diameter protocol servlet as defined by the Diameter protocol application;
invoking a Diameter protocol servlet based on the mapping.

11. A computer program product comprising a non-transitory computer readable storage medium having a computer readable program, wherein the computer readable program, when executed on a computing device, causes the computing device to:
provide a Diameter protocol servlet container having one or more Diameter protocol servlets for processing Diameter protocol messages;
provide a Diameter protocol application that invokes at least one Diameter protocol servlet of the one or more Diameter protocol servlets of the Diameter protocol servlet container;
provide a Diameter protocol application deployment descriptor for the Diameter protocol application; and
deploy the Diameter protocol application in the data processing system using the Diameter protocol servlet container and the deployment descriptor to generate the Diameter protocol application.

12. The computer program product of claim 11, wherein the computer readable program causes the computing device to provide the Diameter protocol servlet container by:
providing a base Diameter protocol servlet, wherein the base Diameter protocol servlet handles basic Diameter message processing and provides support for a basic set of attribute-value pairs.

13. The computer program product of claim 12, wherein the computer readable program further causes the computing device to provide the Diameter protocol servlet container by:
providing one or more base application servlets for one or more Diameter protocol interfaces, wherein the one or more base application servlets extend a functionality of the base Diameter protocol servlet to handle additional attribute-value pairs.

14. The computer program product of claim 11, wherein the computer readable program further causes the computing device to:
provide at least one other protocol container for processing messages in another protocol different from the Diameter protocol, wherein the Diameter protocol container and the at least one other protocol container are integrated with one another.

15. The computer program product of claim 14, wherein the Diameter protocol container and the at least one other protocol container are integrated with one another by sharing a same servlet context object between the Diameter protocol container and the at least one other protocol container.

16. The computer program product of claim 15, wherein the servlet context object provides a Diameter protocol factory application program interface (API) through which the Diameter protocol servlet container creates new sessions and requests from within a Diameter protocol servlet.

17. The computer program product of claim 14, wherein the at least one other protocol container is one of a HyperText Transfer Protocol (HTTP) container or a Session Initiation Protocol (SIP) container.

18. The computer program product of claim 11, wherein the Diameter protocol application is a converged application that utilizes the Diameter protocol and one or more other protocols to perform one or more operations.

19. The computer program product of claim 18, wherein the converged application is one of a HyperText Transfer Protocol (HTTP) and Diameter protocol application, a Session Initiation Protocol (SIP) and Diameter protocol application, or an HTTP and SIP and Diameter protocol application.

20. An apparatus, comprising:
a processor; and
a memory coupled to the processor, wherein the memory comprises instructions which when executed by the processor causes the processor to:
provide a Diameter protocol servlet container having one or more Diameter protocol servlets for processing Diameter protocol messages;
provide a Diameter protocol application that invokes at least one Diameter protocol servlet of the one or more Diameter protocol servlets of the Diameter protocol servlet container;
provide a Diameter protocol application deployment descriptor for the Diameter protocol application; and
deploy the Diameter protocol application in the data processing system using the Diameter protocol servlet container and the deployment descriptor to generate the Diameter protocol application.

* * * * *